Sept. 9, 1969  T. J. HUGHEL  3,466,193
STORAGE BATTERY POSITIVE PLATE WITH LEAD FIBERS
Filed May 1, 1967
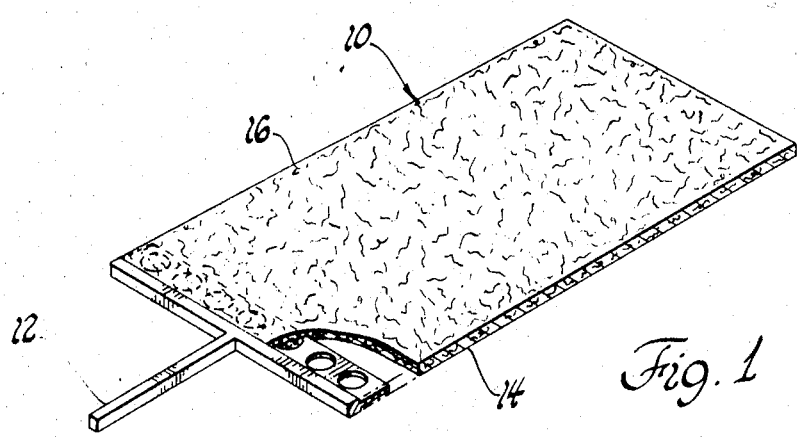
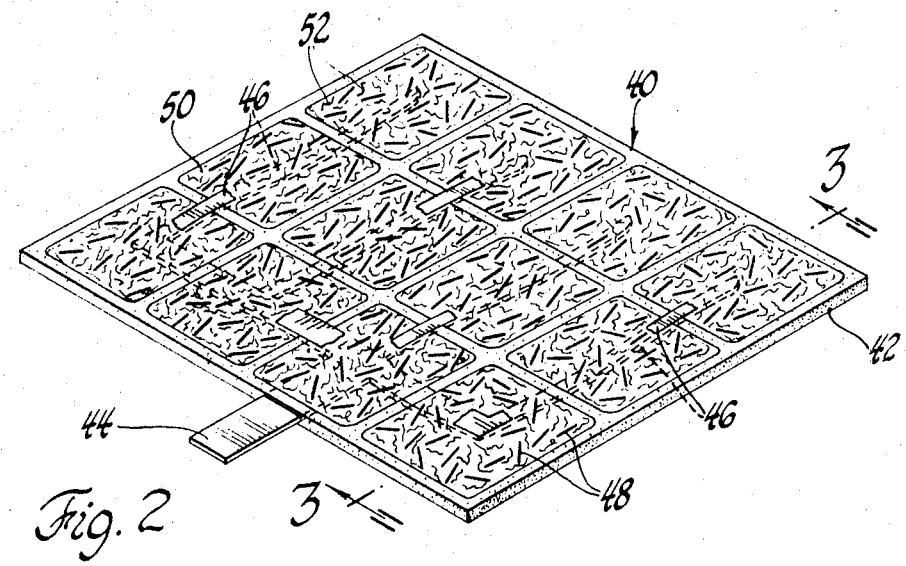
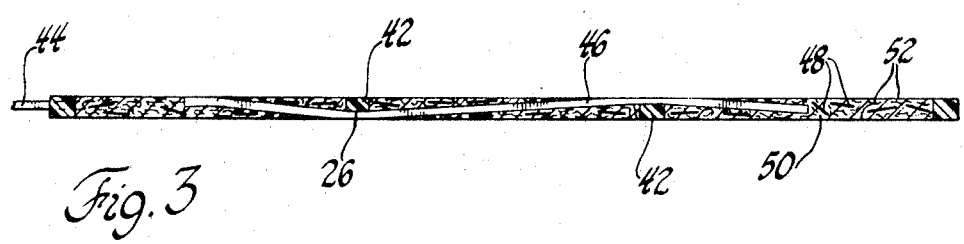
INVENTOR.
Thomas J. Hughel
BY
Peter P. Kozak
ATTORNEY

United States Patent Office 3,466,193
Patented Sept. 9, 1969

3,466,193
STORAGE BATTERY POSITIVE PLATE WITH LEAD FIBERS
Thomas J. Hughel, Royal Oak, Mich., assignor to General Motors Corporation, Detroit, Mich., a corporation of Delaware
Filed May 1, 1967, Ser. No. 634,990
Int. Cl. H01m 39/00
U.S. Cl. 136—26                                4 Claims

ABSTRACT OF THE DISCLOSURE

This invention relates to an improved antimony-free positive plate and a method for making the plate. The positive plate consists of a layer of lead dioxide active material containing 5 to 25 weight percent short lead fibers substantially uniformly dispersed therethrough in such a manner that there is essentially no contact among the lead fibers. The lead fibers in the lead dioxide provide electrical conductivity and strength in the positive plate. In a preferred embodiment of this invention, a plastic frame and a lead connector having a plurality of fingers are incorporated into the positive plate and the layer of lead dioxide contains non-electrical conductive fibers as well as lead fibers.

---

This invention relates to lead acid storage batteries, and more particularly to an improved antimony-free positive plate and a method for making the same.

Most lead acid storage batteries are currently made with positive plates having a grid cast from a lead base alloy containing about 7 to 10 weight percent antimony. Contained within the grid is an active material which is usually lead dioxide. The lead base alloy contains antimony to facilitate the casting of the grid as well as for the strength it provides for the plate. Antimony in lead alloys also increases the resistance of the grid to shedding under deep cycling service. However, the presence of antimony is undesirable since it promotes self-discharge and the decomposition of water while charging. The casting or punching of the standard shaped grids with antimony-free lead is very difficult and not practical in view of the present state of the art.

It is a primary object of this invention to provide an improved positive plate for a lead acid storage battery and a method of making the same. It is another object of this invention to provide a substantially antimony-free positive battery plate. It is still another object of this invention to provide an antimony-free positive plate which is resistant to shedding under deep cycling service. It is yet another object of this invention to provide a positive plate having a reduced metallic lead content.

These and other objects are accomplished in accordance with this invention by a positive plate having a layer of active material paste containing 5 to 25 weight percent short lead fibers substantially uniformly dispersed therethrough in such a manner that there is essentially no contact among the lead fibers. The lead fibers, even though they are essentially discontinuous, that is they are not in contact with one another, provide sufficient electrical conductivity for the positive plate. In addition, the lead fibers provide strength for the positive plate. This construction provides an antimony-free, positive plate which is more resistant to shedding under deep cycling service than other antimony-free, positive plate constructions. This antimony-free positive plate meets the standard SAE (Society of Automotive Engineers) 300 ampere high discharge test and the overcharge life test.

Other objects and advantages of this invention will be apparent from the following detailed description, reference being made to the accompanying drawings wherein a preferred embodiment of this invention is shown.

In the drawings:
FIGURE 1 is a view in perspective of the positive battery plate in accordance with this invention;
FIGURE 2 is a view in perspective of a preferred embodiment of the positive battery plate in accordance with this invention; and
FIGURE 3 is a cross-sectional view of the battery shown in FIGURE 2 taken along the lines 3—3.

Referring to FIGURE 1 of the drawings, the basic embodiment of this invention is the battery positive plate 10. The plate 10 consists of a connector 12 positioned at one end of the plate 10 and in electrical contact with the layer of lead dioxide active material 14 containing 5 to 25 weight percent short lead fibers 16 substantially uniformly dispersed therethrough in such a manner that there is essentially no contact among the lead fibers. The electrical conductivity and durability properties of this positive plate are as good as positive plates containing the standard shaped grid made from the antimony-free lead. The short lead fibers have been found to provide the necessary electrical conductivity and durability for the positive plate described in this invention even though the lead fibers are arranged in the active material so that there is essentially no contact between the lead fibers.

The invention will now be described in detail in terms of a method for making a lead-acid storage battery positive plate such as shown in FIGURE 1. Chopped lead fibers (19.3 grams) are mixed with a standard battery paste containing lead oxide until a homogeneous mixture is obtained.

The lead fibers are obtained by chopping lead wool. The length of the lead fibers is 0.1 to 1 inch with the preferred length being 0.1 to about 0.5 inch. Lead fibers shorter than 0.1 inch do not add or impart sufficient strength to the plate and they tend to oxidize so readily that there is not sufficient lead metal present for electrical conductivity purposes. Lead fibers longer than 1 inch, although desirable in view of the increased strength that normally results from the use of increased fiber lengths, are not desirable for several reasons. Lead fibers longer than one inch tend to form a ball on blending with paste and in this form they do not increase the strength of the plate and are not in a shape which provides the best electrical conductivity characteristics in the plate. In addition, with long lead fibers, a substantially uniformly dispersed mixture with battery paste is difficult to make. The diameter of the fiber is 0.010 inch. The fibers having the proper length are obtained by chopping the fibers in a Waring blender or similar apparatus. The length of the fiber is controlled to some extent by the length of time of chopping in the blender. Other means can be used to chop the lead wool, such as using a scissors or a trimming board, such as is used for trimming photographs.

The concentration of the lead fibers is from 5 to 25 weight percent. Concentrations of the lead fiber less than 5% do not impart sufficient conductivity and strength to the battery plate. Concentrations greater than 25% do not improve the performance of the battery plate significantly and increase the cost of the battery plate considerably. At concentrations above 25% the lead fibers come in contact with one another and are not dispersed in a non-continuous manner.

Any lead-acid type battery paste can be used in this invention. A typical active material battery paste used in commercial batteries consisting of lead oxides, water and sulfuric acid, is eminently satisfactory. The battery paste used in this embodiment consisted of 7777 parts PbO, 1257 parts $H_2O$, 437 parts $H_2SO_4$, and 1557 parts $Pb_3O_4$.

The blending of the battery paste with the lead fibers

's performed adequately with a Baker-Perkins mixer which is a double trough mixer having two rotating blades. This mixer blends the lead fibers uniformly throughout the paste with little or no tendency for the fibers to ball up. It is also possible to mix the short lead fibers with the battery paste by hand mixing using a spatula, although this method is not very satisfactory unless very small quantities are mixed. Care must be taken during the mixing steps so that the lead fibers do not ball up since this is undesirable in that it reduces the strength of the plate and lowers the electrical conductivity thereof.

The lead fiber-battery paste mixture is spread out to form a rectangular layer 3½ inches by 4¼ inches by 1/16 inch. At one end of the plate an antimony-free lead connector is pressed thereto. The battery plate is steamed for one hour and then aged for 4 days under wet burlap in a high humidity chamber. The positive plate is assembled to a negative plate and immersed in a dilute sulfuric acid solution. Direct current is passed through the positive plates for 21 hours thereby converting the lead oxide to lead dioxide. This is the standard positive plate formation process in the battery industry. The resulting positive plate contains a layer of lead dioxide active material containing 23.5 weight percent chopped lead fibers dispersed therethrough in such a manner that there is essentially no contact in the lead fibers.

This positive plate, when subjected to a cycling battery test which simulates short distance driving schedules, has electrical conductivity and durability characteristics which are superior to positive plates containing a standard shaped antimony-free lead grid. These results are unexpected in view of the fact that in the past it has been felt that it is necessary to have a continuous metallic conductive path such as is furnished in commercial batteries by the continuous mass of lead found in the lead grid.

A preferred embodiment of this invention is shown in FIGURE 2 and FIGURE 3. The battery positive plate 40 consists of a plastic frame 42 and a connector 44 positioned thereon so that the connector fingers 46 spread over and are interlaced with the frame 42. The plastic supporting frame 42 is punched or cut from a sheet of polyvinyl chloride (PVC) having a thickness of about 0.0625 inch. Other plastic materials having comparable strength, rigidity and forming properties may be used. The thickness of the frame is not critical and the preferred thickness is 0.0625 inch which is the same thickness approximately as the thickness of the plate. The plastic frame adds strength to the positive plate, especially at the outer edge of the plate. Slots 26, as shown in FIGURE 3, are milled to a depth of 0.0312 inch to permit the passage of the connector fingers 46. The lead connector 44 weighing 30 grams having a thickness of about 0.055 inch is gravity-cast in a simple graphite mold. Although the lead connector 44 is antimony-free, the problems encountered with the casting of the conventional intricate antimony-free lead grids are not encountered in the gravity casting of this simple shape. The fingers 46 of the lead connector 44 are threaded through the PVC frame and the portions of the lead fingers in contact with the PVC frame 42 are pened so that they do not make the assembly thus formed appreciably thicker than 0.0625 inch. The lead connector may have a broad range of shapes, the preferred shape being one in which the lead fingers extend throughout the active material.

In the preferred embodiment of this invention, short non-electrical conductive fibers 48 are mixed with the battery paste 50 and with the short lead fiber 52 to impart increased strength to the positive battery plate. Dynel fiber, an acrylonitrile-vinyl chloride copolymer, is especially well-suited for this application since these fibers are strong and are wetted by battery paste. Other non-conductive fibers which are wetted by battery paste may also be used. The concentration of the non-conductive fiber is from 0.01 to 1.0 weight percent with a concentration of 0.5 weight percent being used in the preferred embodiment. The concentration of 0.5 weight percent Dynel fiber in the active material paste increases the strength of the positive plates significantly. Concentrations of Dynel greater than 1.0 percent are not desirable since the low density of the Dynel fiber results in a positive plate having a large volume of Dynel fiber therein thereby cutting down the quantity of lead fiber necessary for electrical conductivity and the active material necessary for the proper functioning of the plate. The length of the Dynel fibers in the preferred embodiment is 0.025 inch and the diameter is 0.0007 inch.

The battery paste mixture containing 8.7 weight percent short lead fibers and 0.5 weight percent short Dynel fibers therein is spread over one side of the lead connector. Then the plate is turned over and the battery paste is applied on top of the second side of the connector. The battery paste is now applied on top of the plastic frame. The overall thickness of the positive plate is about 0.625 inch. The positive plate contains 30 grams of lead in the connector and 20 grams of lead fibers making a total of 50 grams lead per plate. Since the typical battery contains a lead grid weighing 70 grams, this preferred embodiment of this invention affords a reduction in the total lead content of about 29%. The reduced amount of lead necessary for the positive plates in this invention reduces the overall cost of the positive plate.

The positive plates were cured and formed as previously described.

Five positive plates were assembled with 6 negative plates to form a cell. Six of these cells were assembled into a complete battery. This complete battery was tested in the SAE (Society of Automotive Engineers) 300 ampere discharge test at 0° F. In this test the 10 second voltage was 8.00 volts and a time of 2.0 minutes was required to reach 5 volts. These values exceed the 7.70 and 1.60 values for the 10 second voltage and time respectively required which are the minimum SAE requirements for a 2 SMD battery, the battery requirements for a Chevrolet-type vehicle.

The positive plates made in accordance with this invention have the advantage of being antimony-free, more resistant to deep cycle shedding than other antimony-free positive plates, contain a reduced content of lead and meet the SAE requirements for the 300 ampere discharge test.

While the invention has been described in terms of certain specific examples, it is to be understood that the scope of the invention is not limited thereby except as defined in the following claims.

I claim:

1. An improved positive plate for lead storage batteries, comprising a lead connector having a plurality of fingers spaced throughout said plate and a layer consisting essentially of lead dioxide active material and 5 to 25 weight percent short lead fibers substantially uniformly dispersed therethrough in such a manner that there is substantially no contact among said fibers, wherein said connector and said fibers combine to provide electrical conductivity and strength in said positive plate.

2. An improved positive plate as described in claim 1 wherein said plate has a plastic frame incorporated therewith.

3. An improved positive plate as described in claim 1 wherein said connector is essentialy pure lead.

4. An improved positive plate for lead storage batteries comprising a plastic frame, a lead connector having a plurality of fingers spaced throughout said plate and positioned about said plastic frame, and a layer consisting essentially of lead dioxide and 5 to 25 weight percent short lead fibers substantially uniformly dispersed therethrough in such a manner that there is no contact among said fibers, said layer of lead dioxide containing 0.01 to 4.5 weight percent short non-electrical conductive fibers dispersed therethrough, said layer of lead dioxide positioned around and in close proximity to said connector, said fibers and said frame and said connector providing strength to said positive plate, wherein said connector and said lead fibers combine to provide electrical conductivity in said positive plate.

References Cited
UNITED STATES PATENTS

| | | | |
|---|---|---|---|
| 1,156,315 | 12/1915 | Rowley | 136—26.1 |
| 2,677,713 | 4/1954 | Weil et al. | 136—26 |
| 2,951,106 | 8/1960 | Ruetschi | 136—26 |
| 2,977,401 | 3/1961 | Marsal et al. | 136—120 |
| 3,050,576 | 8/1962 | Comanor | 136—26 |
| 3,194,684 | 7/1965 | Wells | 136—26 |
| 3,201,280 | 8/1965 | Yumoto | 136—26 |
| 3,351,445 | 11/1967 | Fielder et al. | 136—27 |

WINSTON A. DOUGLAS, Primary Examiner

C. F. LEFEVOUR, Assistant Examiner

U.S. Cl. X.R.

136—120

PO-1050
(5/69)

UNITED STATES PATENT OFFICE
CERTIFICATE OF CORRECTION

Patent No. 3,466,193     Dated September 9, 1969

Inventor(s) Thomas J. Hughel

It is certified that error appears in the above-identified patent and that said Letters Patent are hereby corrected as shown below:

Column 5, line 1, 4.5 should be 0.5.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents